United States Patent
Morales-Centeno

(10) Patent No.: US 7,267,538 B2
(45) Date of Patent: Sep. 11, 2007

(54) ADJUSTABLE KNOCKOUT

(76) Inventor: Efrain Morales-Centeno, Box 1117, Coamo, PR (US) 00769

( * ) Notice: Subject to any disclaimer, the term of this patent is extended or adjusted under 35 U.S.C. 154(b) by 0 days.

(21) Appl. No.: 10/445,478

(22) Filed: May 27, 2003

(65) Prior Publication Data

US 2004/0241278 A1    Dec. 2, 2004

(51) Int. Cl.
    *B29C 47/40*    (2006.01)
(52) U.S. Cl. ............... 425/190; 425/556; 425/444; 425/436 RM; 29/557; 29/558; 29/56.5
(58) Field of Classification Search ........... 425/190, 425/444, 436 RM, 556; 29/557, 558, 56.5
    See application file for complete search history.

(56) References Cited

U.S. PATENT DOCUMENTS

| | | | | |
|---|---|---|---|---|
| 3,448,488 A | * | 6/1969 | Kiraly | 425/192 R |
| 3,794,287 A | * | 2/1974 | Atkinson | 249/106 |
| 3,852,011 A | * | 12/1974 | Maiocco | 425/547 |
| 3,900,183 A | * | 8/1975 | Wallace | 249/68 |
| 3,963,209 A | * | 6/1976 | Muller | 249/67 |
| 4,162,138 A | * | 7/1979 | Byrne | 425/125 |
| 4,891,002 A | * | 1/1990 | Inaba et al. | 425/556 |
| 4,929,170 A | * | 5/1990 | Boskovic | 425/556 |
| 5,439,368 A | * | 8/1995 | Martin | 425/190 |
| 6,089,986 A | * | 7/2000 | Reynolds et al. | 470/191 |
| 2004/0113427 A1 | * | 6/2004 | Ernst et al. | 285/333 |
| 2004/0182806 A1 | * | 9/2004 | Figueroa | 211/105.4 |
| 2005/0065517 A1 | * | 3/2005 | Chin | 606/61 |

* cited by examiner

Primary Examiner—Joseph S. Del Sole
(74) Attorney, Agent, or Firm—Eugenio J. Torres

(57) ABSTRACT

This disclosure is directed to an adjustable knockout rod for use in conjunction with injection molding machines. The knock-out rod disclosed herein is preferably formed of a round bar having a plurality of annular notches or undercuts formed at uniform intervals along the length of the bar. The knock-out rod passes through a stationary platen and is retained in position relative to the stationary platen by a split collar. The split collar is designed to be inserted into the stationary platen in more than one orientation thereby effecting adjustment of the knock-out rod a distance and interval less than the distance between the adjacent notches on the rod. Additionally, the quick adjusting knockout rod disclosed herein is provided with means for fine adjustment of the overall length of the rod.

3 Claims, 2 Drawing Sheets

ADJUSTABLE KNOCKOUT

STATEMENT REGARDING FEDERALLY SPONSORED RESEARCH AND DEVELOPMENT

N/A

RELATED APPLICATIONS

N/A

BACKGROUND OF THE INVENTION

1. Field of the Invention

The present invention relates generally to injection molding systems and ejection subsystems for use therein and, in particular, to adjustable knockout rods to effect the proper ejection of articles of manufacture made by injection molding systems.

2. Discussion of the Background

In general, the art of injection molding is well known. A mold, usually comprised of two parts having matching spaced apart surfaces to form a cavity for receiving injection material, forms the major component of the injection molding machine. Usually, one of the mold parts is movable relative to the other to facilitate removal of the article of manufacture which is formed within the mold. The movable mold is provided with an ejector for removing the article of manufacture from the mold surface.

Currently, a conventional knockout is an iron cylinder bar of approximately one inch in diameter and a length that fluctuates between approximately 8 and 14 inches. It has screw thread in both sides that varies between ½" and ⅝". This is used to support the ejector plate of the mold in the machine's piston to realize its function: remove the unit already fabricated in the mold and return it to its original position. Every knockout mold has its own specification.

U.S. Pat. No. 3,448,488 to Kiraly discloses a "quick adjustment knockout rod", but not an adjustable one, where adjustable ejector actuating means are provided to actuate the ejector at a certain position of travel of the movable mold. Prior to Kiraly ejector actuating means of the prior art had been of the threaded bar type which are threadedly secured to a stationary portion of the injection molding machine. Thus, when the molds of the injection molding machine are changed to manufacture different articles, it is often necessary to also change the position of the threaded bar to insure that the ejector is actuated properly. This bar, or knockout rod, must be unfastened from its locked position and threadedly adjusted to vary its length and then again locked in place. It is common to utilize two or more knockout rods to effect proper ejection of an article of manufacture. Therefore, each knockout rod must be accurately adjusted so as to work together.

In so adjusting the position of the knockout rods of the prior art, prior to the Kiraly invention, a time interval of approximately 45 minutes was required to adjust the length of the rod over a distance of 30 inches.

Therefore, one of the primary objects of the Kiraly invention, particularly from a maintaining standpoint, was to provide a knockout rod for injection molding machines which could be adjusted accurately over short and long lengths in a minimum of time.

Another object was to provide a knockout rod for injection molding machines which had a finite number of adjustable positions and an infinite number of adjustable positions in between each finite position.

An injection molding machine operates so rapidly that it can quickly finish a run of a particular molded part in a comparatively short period of time. In view of the substantial cost of the machine, it cannot be allowed to sit idle. The mold base in the machine has to be removed and a new mold base inserted so that the machine can continue to operate. The time taken in changing the mold base must be limited so the machine can begin productive use. It currently takes from one to several hours to complete a mold base change. This lost time has a marked effect on the profitability of a company.

In order to speed up the mold change process, attempts have been made to equip the platens of the molding machine with an array of clamps and guides for supporting the mold base.

The problem of changing mold bases is not limited to injection molding machines. Similar problems are presented in changing the die or mold in a stamping press. In both situations, the mold set weighs a substantial amount and must be handled carefully to avoid damage to the mold, die, and press.

At the present time, there does not appear to be a simple system for interchanging mold bases in less than one hour. Also, there does not appear to be a simple system that would allow many different size mold bases to be equipped with a common ear plate which would enable the mold bases to be readily changed in a molding process. U.S. Pat. No. 5,439,368 to Martin disclosed a quick change system for mold bases employing adapter frames which are attached to the platens of the molding machine. Such quick change system allows mold bases, equipped with standard ear plates, to be changed in a press in ten minutes, or even less time.

U.S. Pat. No. 4,929,170 to Boskovic discloses an ejector blade for ejecting parts from injection molds after a part has been formed, but does not mention adjustability.

Ejector pins are common parts of plastic injection molds. Pins of various sizes and shapes are used to help remove parts from a mold as the mold cavity is opened. Typical ejection pins are illustrated in U.S. Pat. Nos. 3,794,287, 3,852,011; 3,900,183, and 4,162,138.

While ejector pins, whether round, flat or otherwise shaped, are effective in normally ejecting plastic parts from a mold, they do suffer deficiencies. First, because pins are a unitary part, the injection molder must stock a larger quantity of pins of different sizes, lengths, and configurations in order to accommodate different molded parts. Secondly, because pins are single piece structures, they are quite rigid, and any variations in a mold, whether it is due to improper tolerances or unequal expansion of one mold part relative to the other, cannot be accommodated by a pin. Such variations often lead to bending or breaking of the pins, requiring their replacement. Boscovic's patent provided a solution to the above deficiencies in the prior art, and others, by providing an ejector blade for a plastic injection mold which comprises a series of parts, namely an elongate shank portion, a blade portion, and means releasably joining the shank portion to the blade portion at the ends thereof, so that different blade portions can be mounted on a given shank portion. In the preferred embodiment of Boscovic's invention, blades of differing lengths can be secured to one shank, while shanks of differing lengths can be used with a blade of a particular length providing substantial versatility to the ejector blade.

U.S. Pat. No. 3,963,209 to Muller discloses an ejector pin assembly for injection molding tools in which the ejector pin plate of the tool is adapted to be brought back by force to the idle original position thereof in connection with the clamping or closing of the mold.

The primary object of the Muller invention is to provide an ejector pin assembly that guarantees the forced retraction of the ejector pin plate to the original position and at the same time fixedly locks the same in the rear position thereof. This later characteristic is of special importance by the use of high-speed machines where there is a danger that the ejector pin plate is brought to undesired movement by recoil forces or the lie.

The function of the adjustable knockout of this invention in the mold of an injection molding machine is to push the plate injector outward to take out the molded parts and then return the plate injector to its original position. This knockout rod could run different molds because it adjusts to the desired length reducing the setup time, the unnecessary breakage of machines, and reducing by 50% or more the quantity of knockouts used in the area.

No prior art has been found to disclose adjustable knockout or ejector pins or tools for use in injection molding machines.

However, various types of knockout rods or ejector pins are available in the prior art, including one which discloses a "quick adjustment knockout rod". U.S. Pat. No. 3,448,488 to Kiraly discloses a "quick adjustment knockout rod" but not an adjustable one. The disclosure in Kiraly is directed to quick adjusting knockout rods which have particular utility when used in conjunction with injection molding machines.

While these devices or methods in the prior art fulfill their respective, particular objectives and requirements, none of them disclose an adjustable knockout or ejector pins or tools for use in injection molding machines. Thus, it can be appreciated that there is a continuing need for an adjustable knockout for use in injection molding machines which overcomes these and other deficiencies in the prior art.

In this respect, the adjustable knockout according to the present invention substantially departs from the conventional concepts and designs of the prior art and, in doing so, provides an adjustable knockout that fulfills the aforementioned need.

SUMMARY OF THE INVENTION

The object of the present invention is to provide a new and improved adjustable knockout for use in an injection molding machine.

It is a further object of the present invention to provide an adjustable knockout which has all the advantages of the prior art, while simultaneously overcoming the disadvantages normally associated therewith.

Still another object of the present invention is to provide an adjustable knockout which facilitates and simplifies the set up process because it is adjusted to the desired measurement.

It is still another object of the present invention to provide an adjustable knockout that helps prevent frequent breakage of molding machines.

It is another object of the present invention to provide an adjustable knockout that is simple, functional, and economical for the growing injection molding industry.

Another object of the present invention is to provide an adjustable knockout which enables its user to lower operational costs.

A further object of the present invention is to provide an adjustable knockout that creates a cleaner and safer environment for workers, provides better space utilization, and is easy to maintain.

Still a further object of the present invention is to simplify and facilitate the setup process of the injection molding machine.

Another object of the present invention is to prevent unnecessary cracks in the moldings and machinery.

It is still another object of this invention to reduce setup time and knockouts used.

It is another object of the present invention to provide a new and improved adjustable knockout which may be easily and efficiently manufactured.

It is a further object of the present invention to provide a new and improved adjustable knockout which is of durable and reliable construction.

An even further object of the present invention is to provide a new and improved adjustable knockout which is susceptible of a low cost of manufacture with regard to both materials and labor, and which accordingly is then susceptible of low prices of sale to the consuming public, thereby making such adjustable knockout economically available to the buying public.

The adjustable knockout itself, both as to its construction and its mode of operation, will be best understood and additional objects and advantages thereof will become apparent by the following detailed description of a preferred embodiment taken in conjunction with the accompanying drawings.

When the word "invention" is used in this specification, the word "invention" includes "inventions", that is, the plural of "invention". By stating "invention", the Applicant does not in any way admit that the present application does not include more than one patentably and non-obviously distinct invention and Applicant maintains that the present application may include more than one patentably and non-obviously distinct invention. The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DESCRIPTION OF THE PREFERRED EMBODIMENT

Figure 1:
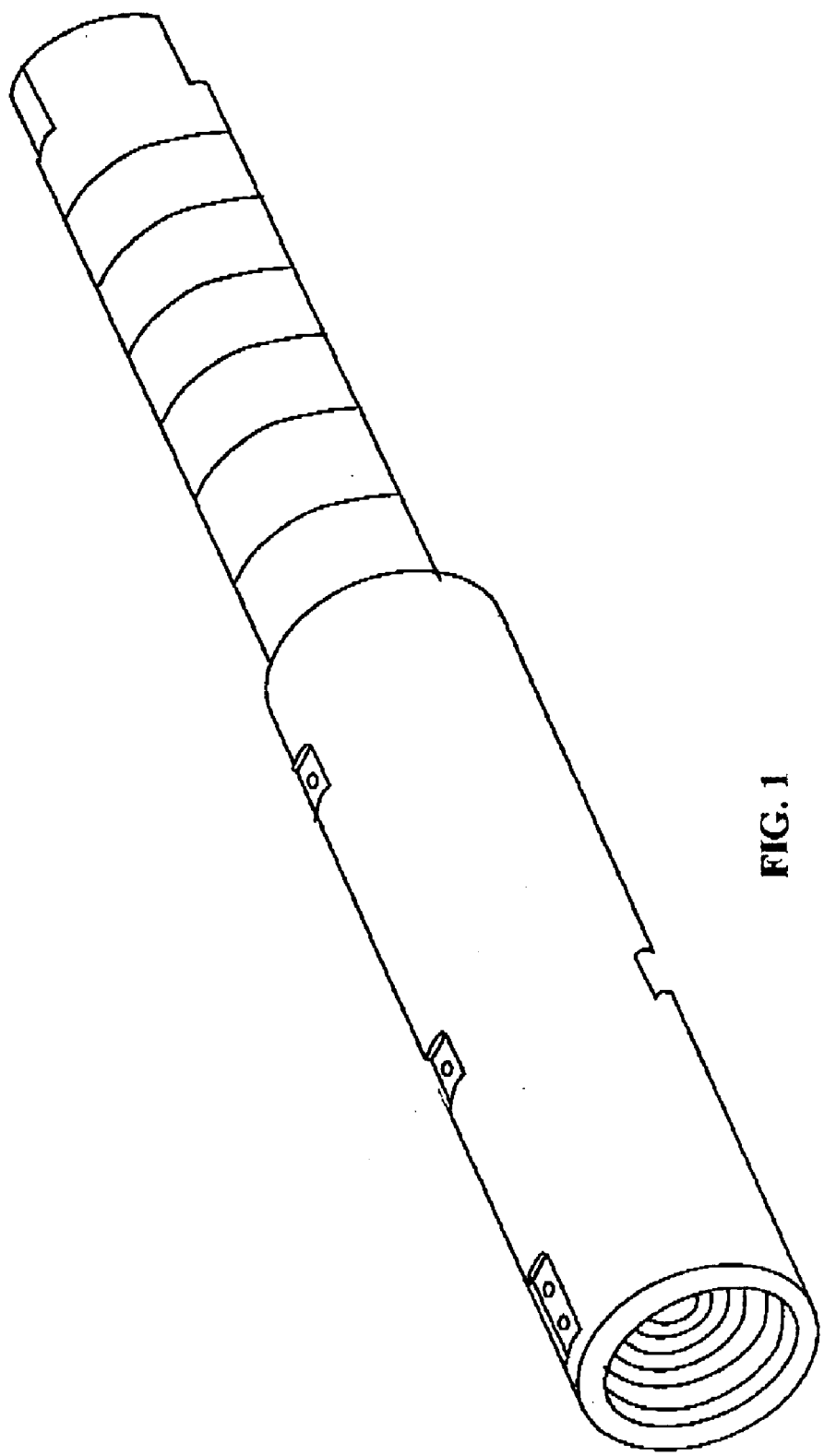
FIG. 1 is a plane view of the adjustable knockout of the invention.
Figure 2:
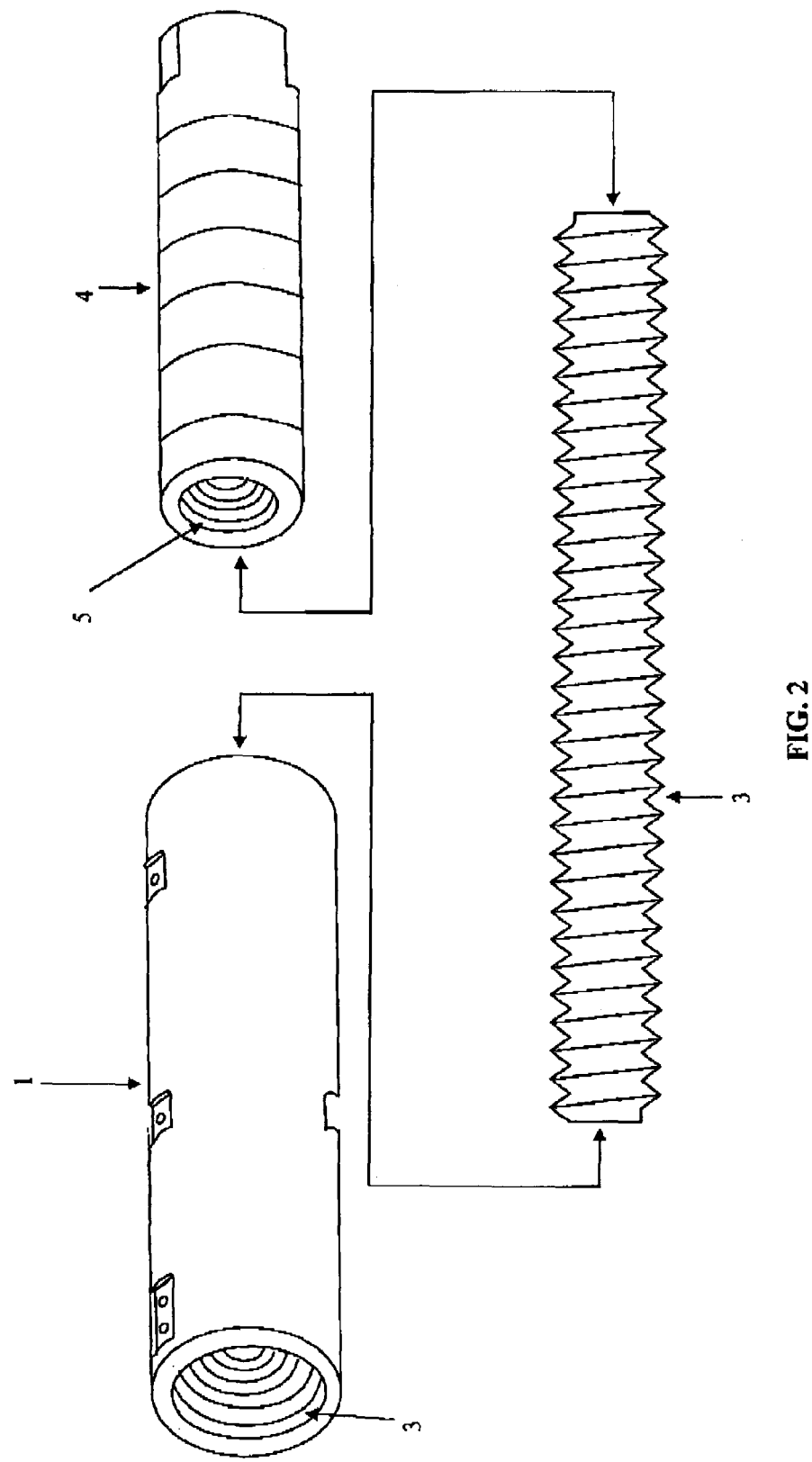
FIG. 2 is a plane view of the external cylinder, the internal cylinder, and the adjustment screw of the adjustable knockout of the invention.

Referring now to the drawings, wherein like reference numerals designate the corresponding structure, part, or element, as the case may be, throughout the views, and particularly to FIG. 2, an adjustable knockout constructed in accordance with the preferred embodiment of the present invention comprises a first hollow cylindrical bar 1 having a first end and a second end, and a plurality of holes for securely fixing the knockout, said first bar's second end having a first internal screw thread 2, wherein said first bar's second end's internal screw thread's diameter tapers in width from larger to smaller towards the interior of said first bar so as to threadedly secure the knockout to a stationary portion of the injection molding machine having different sizes, an adjustment screw with uniform running screw thread 3 having a first end and a second end, wherein said adjustment screw's first end is rigidly fixed inside said first hollow cylindrical bar up to a distance that allows that said adjustment screw's second end is almost aligned with said first bar's second end's edge, and a second hollow cylindrical bar 4 having a first end and a second end, a second internal screw thread along said second bar's first end 5, and a third uniform internal screw thread extending from the second bar's second end towards the center of said second bar, wherein said second internal screw thread tapers in width from larger to smaller for threadedly securing the knockout to a stationary portion of the injection molding machine, wherein the adjustment screw is of a smaller diameter than the second cylindrical bar's second internal screw thread, and said second cylindrical bar's external diameter is smaller than said first cylindrical bar's second end's internal diameter so as to allow said second bar to be threadedly adjusted to said adjustment screw to vary its length and then be locked in place, and said second bar having a plurality of marks so as to indicate the length that the knockout is being adjusted to.

When the molds of the injection molding machine are changed to manufacture different articles, the knockout rod must be unfastened from its locked position and threadedly adjusted to vary its length and then again locked in place.

In the preferred embodiment, the material used in the bars is steel, and the screw is made of galvanized iron. Both materials are very economical in the market.

The process of making the adjustable knockout of the invention includes the following steps:

(1) Cutting all materials to be used to approximately the desired size.
(2) Placing the bars in a conventional "turner" to bring them to their exact measurements and to make the internal screw thread to an exact measurement.
(3) Placing the bars in a milling machine to make the lateral screw thread that would hold the screw and those that fix the knockout to the desired measurement.

Many embodiments of the invention are possible by adjusting the measurements of the adjustment screw or either of the bars.

In the preferred embodiment of the present invention, the knockout may be attached to the molding and the machine. This provides the most precise configuration. However, the knockout may just be attached either to the molding or to the machine (in either case the molding needs a spring) or the knockout may be loose on both sides, however, this may damage the molding machine in the long run.

Thus, there has been shown and described an adjustable knockout for use in injection molding machines which fulfills all the objects and advantages sought therefor. The invention is not limited to the precise configuration described above. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. For example, the particular shapes and proportions of the elements of the knockout may be varied as desired. Accordingly, all such changes, modifications, variations and other uses and applications which do not depart from the spirit and scope of the invention are deemed to be covered by this invention as defined in the following claims.

All of the patents recited herein are hereby incorporated by reference as if set forth in their entirety herein. The details in such patents may be considered to be incorporable at applicant's option, into the claims during prosecution as further limitations in the claims to patentably distinguish any amended claims from any applied prior art.

What is claimed is:

1. An adjustable knockout for use in injection molding machines, comprising;
   a first hollow cylindrical bar having a first end, a second end, and a plurality of holes and notches at uniform intervals for securely fixing the knockout, said first bar's second end having a first internal screw thread, wherein said first bar's second end's first internal screw thread's diameter tapers in width from larger to smaller towards the center of said first bar so as to threadedly secure the knockout to a stationary portion of an injection molding machine of different sizes;
   an adjustment screw with uniform miming screw thread having a first end and a second end, wherein said adjustment screw's first end is rigidly fixed inside said first hollow cylindrical bar up to a distance that allows said adjustment screw's second end to be substantially aligned a with said first bar's second end's edge; and
   a second hollow cylindrical bar having a first end and a second end, a second internal screw thread cut along said second bar's first end, and a third uniform internal screw thread extending from the second bar's second end towards the center of said second bar, wherein said second internal screw thread tapers in width from larger to smaller for threadedly securing the knockout to a stationary portion of an injection molding machine of different sizes;
   wherein the adjustment screw diameter is smaller than the diameter of the second cylindrical bar's second internal screw thread, and said second cylindrical bar's external diameter is smaller than said first cylindrical bar's second end's internal diameter so as to allow said second bar to be threadedly adjusted to said adjustment screw to vary the length of the knockout and then be locked in place; and
   said second bar having a plurality of marks so as to indicate the length that the knockout is being adjusted to.

2. The adjustable knockout of claim 1, wherein said first bar and said second bar are made of steel.

3. The adjustable knockout of claim 2, wherein said adjustment screw is made of galvanized iron.

* * * * *